(12) United States Patent
Schultz

(10) Patent No.: US 12,198,195 B2
(45) Date of Patent: Jan. 14, 2025

(54) SYSTEMS AND METHODS FOR PROCESSING WORKERS COMPENSATION CLAIM ADMINISTRATION TO FACILITATE CLAIM RESOLUTION

(71) Applicant: ACLAIMANT, INC., Bloomfield Township, MI (US)

(72) Inventor: Michael A. Schultz, Bloomfield Township, MI (US)

(73) Assignee: Aclaimant, Inc., Chicago, IL (US)

( * ) Notice: Subject to any disclaimer, the term of this patent is extended or adjusted under 35 U.S.C. 154(b) by 76 days.

(21) Appl. No.: 14/627,646

(22) Filed: Feb. 20, 2015

(65) Prior Publication Data
US 2015/0242956 A1 Aug. 27, 2015

Related U.S. Application Data

(60) Provisional application No. 61/943,169, filed on Feb. 21, 2014.

(51) Int. Cl.
*G06Q 40/00* (2023.01)
*G06Q 40/08* (2012.01)

(52) U.S. Cl.
CPC ................... *G06Q 40/08* (2013.01)

(58) Field of Classification Search
CPC .................................................. G06Q 40/08
USPC ......................................................... 705/4
See application file for complete search history.

(56) References Cited

U.S. PATENT DOCUMENTS

| | | | |
|---|---|---|---|
| 8,666,786 B1 * | 3/2014 | Wirz | G06Q 40/08 705/30 |
| 2006/0116911 A1 * | 6/2006 | Tremblay | G06F 19/3418 705/4 |
| 2008/0046297 A1 * | 2/2008 | Shafer | G06Q 10/10 705/4 |
| 2008/0154672 A1 * | 6/2008 | Skedsvold | G06Q 10/063114 705/7.26 |
| 2011/0161100 A1 * | 6/2011 | Peak | G01C 21/36 705/2 |

(Continued)

*Primary Examiner* — Hai Tran
(74) *Attorney, Agent, or Firm* — Manatt, Phelps & Phillip; Timothy W. Lohse

(57) ABSTRACT

A system, method, and process improving the efficiency of the current workers compensation information supply chain, logistics and claims adjudication process and capture of data capture and analysis of work-related incidents. Employees, employers and insurance companies are legally, financially, ethically and morally compromised when unnecessary delays take place in the claims reporting process. Late reporting of an accident, injury or illness reduces the projected time line that it takes for an injured employee to return to full or partial health and the ability to return to work. Reducing lag time reporting reduces the financial exposure to the employee, employer and a workers compensation risk transfer facility also known as an insurance company. There is need for a fiduciary of claims information to have greater speed, reliability and accuracy of the information initiated through mobile devices and web portals through computers with Internet access. When combined with behavioral science professionals/concierge services or a relevant party follow-up team, the Workers Compensation rights of the employee, employer and insurance carrier are preserved and executed with greater transparency.

12 Claims, 11 Drawing Sheets

(56) References Cited

U.S. PATENT DOCUMENTS

2012/0022897 A1* 1/2012 Shafer .................... G06Q 40/08
705/4

* cited by examiner

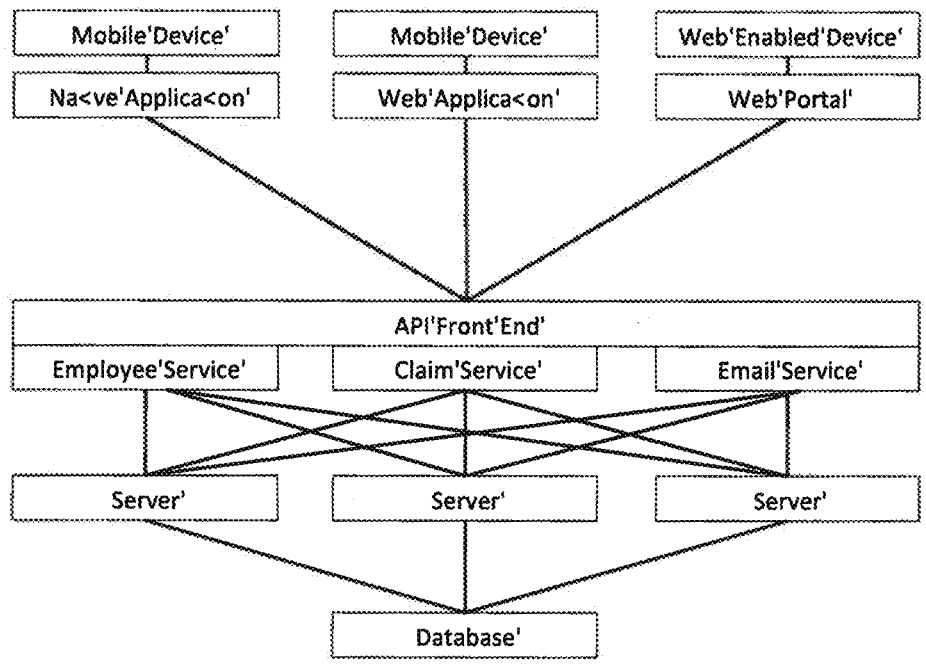

FIGURE 13

| | Pre-Injury Incentives | Post Injury Incentives |
|---|---|---|
| Deals, discounts, and coupons | • Health and wellness screening<br>• Injury prevention courses<br>• Comorbidity prevention treatment (exercise, supplements, nutrition, etc.) | • Treatment fulfillment deals Treatment center, therapy center, medication, rehabilitation center discounts |
| Cash, cash equivalent, or gift card | | • Received for following appropriate channels to report injury and visit doctor in timely fashion<br>• Received for adherence to treatment plan recommended by doctor |
| Sharing of information | • Health and wellness information to prevent comorbidities and injuries at work<br>• Workers rights<br>• Insurance information | • Insurance plan coverage<br>• Cost planning and avoidance of out of pocket expenses |

SYSTEMS AND METHODS FOR PROCESSING WORKERS COMPENSATION CLAIM ADMINISTRATION TO FACILITATE CLAIM RESOLUTION

TECHNICAL FIELD

This application is directed to methods, processes, and systems using mobile devices, mobile and web applications, and people to reduce the time it takes an injured worker to report and resolve or treat an injury, illness or accident at the worksite, and improving safety of workplace conditions through the use of data analysis. These methods processes and systems will reduce the time it takes an injured employee to return to health, return to work, meet regulatory, compliance and administrative reporting required in the workers compensation claim execution process and improve the ease with which employers are able to identify and correct dangerous or hazardous areas in the work place.

BACKGROUND

Workers compensation benefits are recognized as the original no-fault law where an employer is granted immunity from tort actions in exchange for guaranteed benefits for the injured worker. More commonly referred to as "exclusive remedy" the financial formulas for medical and indemnity payments are regulated by statute and are generally accepted by insurance carriers as the default option for providing requisite medical and indemnity payments.

While known technologies have proven to be acceptable for protecting and preserving an injured workers rights and guiding them through the workers comp insurance benefit process, such conventional technologies are nevertheless susceptible to improvements that may enhance their overall performance and cost. Therefore, a need exists to develop improved technologies for protecting and preserving an injured workers rights and guiding them through the workers comp insurance benefit process.

SUMMARY

Embodiments of the present application may be directed to an incident management and tracking system, which is designed to: (1) make it easier to report and communicate incidents in the workplace, (2) capture adequate information quickly and seamlessly to simplify the claims adjudication process, (3) integrate with third parties with built-in logic to assist in the execution, investigation and executing a claim, (4) capture information in a way that makes analysis and investigation of trends simpler and easier. As a result, embodiments of the present application provide a series of tools throughout an organization that organizes and synchronizes information capture, distribution, and subsequent follow-up related to incidents as they occur in the workplace and as they are related to the work comp process.

In one configuration, systems and methods are provided for using a web portal, a mobile device, a concierge team, and related parties to optimize the workers compensation information supply chain. By reducing the time that it takes for an injured employee to return to work, an employer can reduce the cost of their W.C. Modifier and improve the loss ratio of an insurance carrier. An aligned interest between all relevant parties that adopt the disclosed process (the "Aclaimant/A.C.T. process") will validate technological, financial, legal, and cultural win-win initiatives. An employer sets up all of their employees using the system, having each employee install an application on their mobile phone. An injured worker then may use the application to confirm their eligibility for their workers compensation insurance, report their injury to all relevant parties, including the capture of relevant information like date, time, nature of injury, witnesses, and location of an injury. Relevant parties to the claim including HR manager, business owner, an on site supervisor, company counsel, and insurance carrier claims representative are then alerted to the claim. At this point, an injured party is shown a list of physicians and facilities that meet the standard for an Accountable Care Organization and can either seek treatment from a designated approved list or choose a physician of their choice if permitted by state jurisdiction. A representative from the concierge team contacts the employee to walk them through a series of questions that they may have, and to begin to collect information from the employee about physician and treatment plans. After the employee visits a physician, a representative from the concierge team contacts the physician to gather a copy of the treatment plan, and then communicates with the employee by phone or through the application to ensure adherence to a return to health treatment plan. A user is invited to participate in a dialogue that educates the user on incentive(s) paid or otherwise to measure performance based outcomes.

In the meantime, information needed to execute the claim is compiled from relevant parties using the web portal including a) information from the initial filing of the claim, b) report from a physician and progress since, and c) information from relevant parties needed to execute the claim. All of this information is subject to a privacy policy but is available to all parties in the claim. User ID and password protocol is communicated directly to the employee using the mobile application or the web portal in order to view the information.

When it is time for a claim to be paid, employees can see the status of the payment of their claim, either to them or a third party through the application, and can receive payment, when appropriate through the application.

Should an employee need additional vendors to process their claim, whether rehabilitation centers, specialist recommendations, or legal counsel to further prosecute a claim, the application suggests relevant and reputable parties to simplify the process. In some embodiments, the mobile application can communicate and transact with these third parties with the click of a button.

Throughout the process, there will be bi-weekly to monthly information updates that request current and relevant information before, during and after a claim has incurred. Updates serve multiple purposes. Updates will re-affirm correct information and eligibility and avoid future delays from improper information in the system. Second, the employee will be invited back to the application with a multitude of offerings that represent their interest in personal health and welfare benefits. Genuine transparency will reinforce the compliance function that is required by OSHA rules and regulations that can be used to further ensure their health and safety on the job.

The application also provides employees with wellness information as preventative measure. In the event an injury, accident or illness identifies chronic or acute comorbidities associated with the injured employee, an option exists to concentrate on those comorbidities. Studies have proven that comorbidities are often overlooked or misunderstood and significantly contribute to the increase in the severity and frequency of worker injuries while on the job or in their effort to return to work. Other features and advantages of the present invention are consistent with our deliverables. The following description of the preferred embodiments, taken in conjunction with the accompanying drawings, illustrate by way of example, the principles of the invention.

Finally, in some embodiments, work completed by a concierge or personal follow-up team can be executed via algorithms and self reporting done by the mobile application and information entered into a web portal via third parties, including doctors, pharmacies, and treatment centers.

The details of one or more implementations of the disclosure are set forth in the accompanying drawings and the description below. Other aspects, features, and advantages will be apparent from the description and drawings, and from the claims.

DESCRIPTION OF DRAWINGS

The various embodiments provided herein are described in detail with reference to the following figures. The drawings are provided for purposes of illustration only and merely depict typical or example embodiments. These drawings are provided to facilitate the reader's understanding of the invention and shall not be considered limiting of the breadth, scope, or applicability of the embodiments. It should be noted that for clarity and ease of illustration these drawings are not necessarily made to scale.

FIG. 13 depicts an exemplary block diagram of a system for reducing the time of the workers comp claims adjudication process and for increasing the speed with which an injured employee can return to work;

FIG. 14 depicts an exemplary overview of the different incentives that can be provided to employees pre and post injury.

Figures 19, 20:
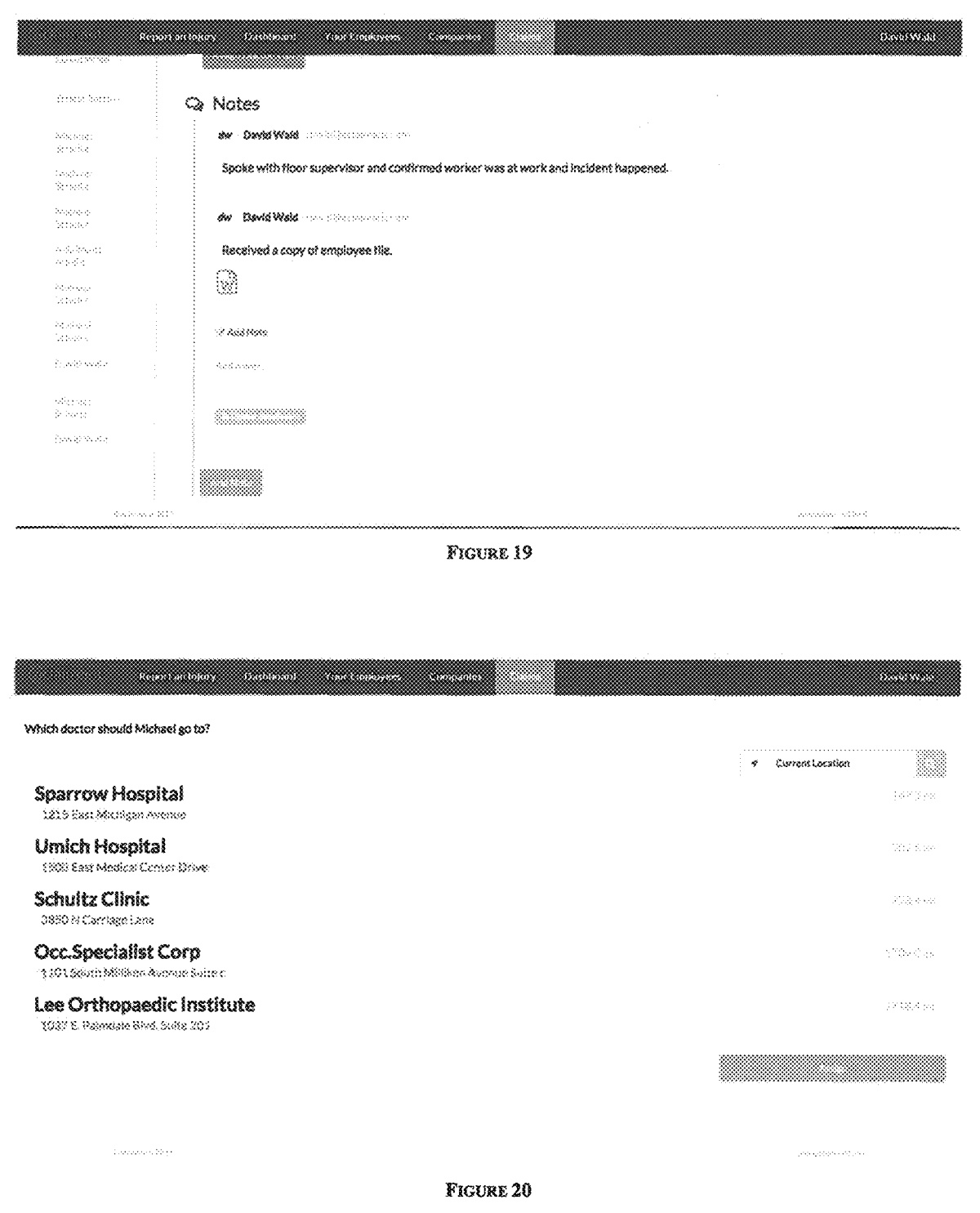

FIGS. 17-19 illustrate an exemplary embodiment of a claims file overview, whereby a user can easily see and understand the current status and information related to a workplace incident or injury. Included in this file are helpful pieces of information about the incident, pre-populated pieces of information about the employee, and any notes or instructions added through the system. Also shown in this file are links to other modules that allow the easy addition of notes, helpful files including PDFs, images, and movies, and the ability to incorporate certain instructional modules, like recommending doctors from a pre-approved list to an employee.

FIG. 20 is an exemplary embodiment of a recommended physician portal, whereby an admin or supervisor can select a doctor from a pre-selected list to recommend for an employee's treatment. Such as list is generated from a larger pre-approved list is curated based on GPS location of the injured worker. Upon selection, a note can automatically be added to the file, the injured worker receives information about the physician or clinic they are to visit, and the supervisor is provided instructions on how to contact and schedule an appointment for their injured employee.

DETAILED DESCRIPTION

Figure 1:
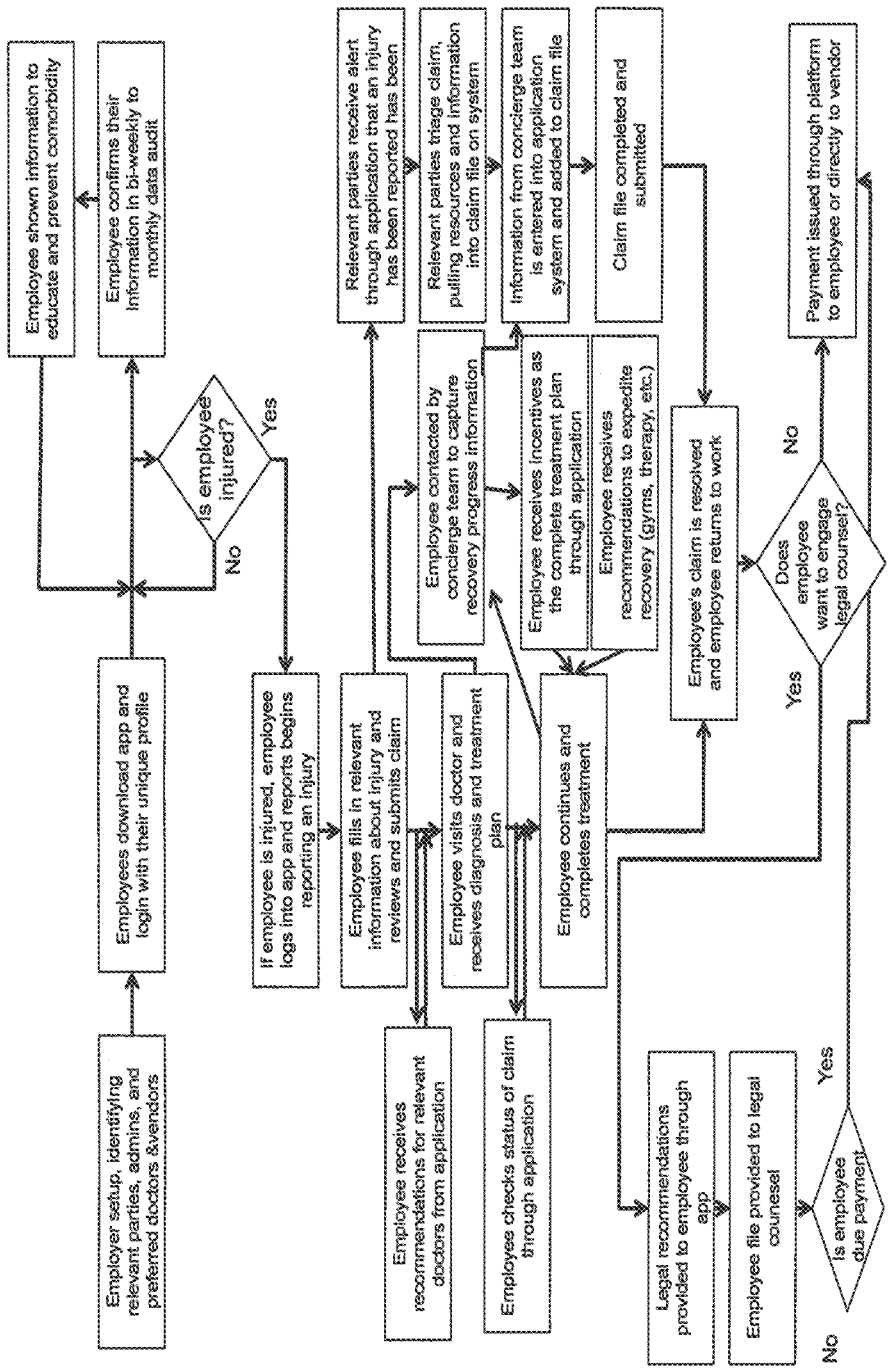
FIG. 1 depicts an exemplary flow diagram of the employee setup, and claims adjudication process.

Embodiments of the present invention relate to systems, methods, and processes for collecting and synchronizing the timely accumulation and dissemination of information required for the workers comp claims adjudication process, and for expediting the return of an injured worker to health. Embodiments provide a web portal and mobile applications, along with a designated concierge team of behavioral specialists and product and service providers that expedite timely information, increase the ease of reporting and triaging of injuries incurred from an injury, illness or accident. Relevant parties using our systems are effectively auditing the claims adjudication process in real time through the active management of claimant follow-up, follow-through, product and service vendor deliverables, feedback and reporting.

In some embodiments, a user or manager may report an incident or claim at the workplace through use of a pre-identified injury reporting hotline or injury reporting SMS service. SMSing or calling these services can automatically setup an injury file for follow-up with a designated party, capturing worker information upon contact. In the instance of an injury hotline, a recording of the call can be added to the pre-populated file using recording features common with most VoiP services that can allow a record of the conversation to be available for future follow-up. In some embodiments, mobile devices such as smart phones or tablets are provided with applications, and are coordinated with a web enabled device accessing a web portal, and a concierge service follow-up team, that allow users to easily understand and preserve their rights, understand their insurance information, learn about ways to stay healthy at home and at work and prevent the probability of injury, report injury information to relevant parties at work and involved in the worker's compensation claims resolution process, communicate with and receive communication from these relevant parties to work through their return to health treatment plans, receive updates on the status of their claims, and finally, receive confirmation of payment or direct payment if needed. A worker using the application may also receive information about any of the health care comorbidities that are shown to cause recovery time to be delayed. The ability to be stealth in identifying comorbidities is another benefit that an employee can use to diagnose and treat these diseases. Some of the kinds of information that a worker can report about their injury includes, nature, time, and date of the injury, pictures of the injury (if appropriate), injury location and pictures of the injury location, witnesses to the injury and/or video testimony of witnesses to an injury. Pre-collected information can then be used to help expedite the injured workers claim resolution process including identifying local recommended physician and treatment facilities, capturing employee relevant information for processing of claims (including name, email, identifying information, and job information). The information collected and shared can help expedite an injured parties return to health, and, through use of incentives, can increase the speed in the return to work process even further.

The result is a system and method which coordinates, synchronizes, and pre-populates data capture in a way to expedite the workers comp claims resolution process, and more quickly return an injured party to work. The data is then analyzed and converted into a decision tree matrix that may further be accessed by insurers and legal counsel, if claims require legal action, to expedite the process and provide transparent information for the more transparent resolution of a claim.

Employers who use this kind of system, may be able to show reduction in on the job time missed due to injury, due to injury mitigation and prevention, and, subsequently, may be able to show process improvements allowing for reduction in workers compensation costs. In addition, the amount of time required to train a workforce and mangers to understand and ensure best practices in handling injuries at the workplace will be reduced while quality and responsiveness are increased. By capturing information at in a pre-identified format, later examination and analysis of the data is streamlined.

In some embodiments, injured users may use the application and concierge follow-up team to receive incentives to speed their recovery from work. These include, but are not limited to, receiving financial discounts on treatments, medications, or use of facilities recommended by a physician, receiving cash or cash equivalent gift cards for completion of steps along the recovery process including regular or timely visits to a physician and adherence to a recommended recovery schedule self reported through the application or communicated and followed-up on through the concierge follow-up team, and, finally, recommendations from the concierge follow-up team on how to best use their insurance policy to avoid receiving additional out of pocket fees.

In some embodiments, the physicians recommended by the app can include a pre-identified group of physicians (telemedicine). The application can instantly connect injured workers with pre-identified relevant physicians by phone call or video call, who provide consultation, evaluation, and a treatment plan over the phone. Using features of the smart phone including camera, video, and information from the injury report, physicians are able to provide more accurate and instantaneous feedback to injured workers and continue to expedite the process. Finally, physicians contacted in this way are setup with their own web portal and access point, so that they are able to receive relevant information as soon as they receive contact from an injured party and are able to be resubmit information through the same portal.

FIG. 1 illustrates an exemplary process for preventing and adjudicating worker compensation claims, and returning injured workers to health quickly. The process begins with the setup of an employer on the system, through use of the web portal. During this phase, relevant information is pre-populated about employees to expedite the claims adjudication process including personal and job related class code information. In addition, company level information including the identification of relevant parties occurs at this time, for easy contact at a later date. Upon setup in the application, employees receive either an email or a text message, depending upon their preference and wherewithal to download the mobile application from a secure link.

Eligible employees enter username and password information to identify themselves correctly in the mobile application. After installation, employees are prompted at preset time periods (at an employer's discretion) to provide confirmation of job and personal information, and to receive relevant information on workplace health and safety and general health and wellness. During these recurring "data audits" employees are also presented with invitations to participate in health and wellness screenings for identifying and preventing comorbidities in addition to webinars, lunch and learn seminars and other related preventative health and welfare services. Systems including push notifications, and email and text notifications, along with gamification options used to incent and remind users to return to the application to complete these processes. The application is also to be used by an employee to check their insurance eligibility information and to ensure their rights to Work Comp benefits are not compromised. This information is populated by an employer at the time of setup and also updated by health and welfare, safety and loss control service providers contracted by the employer.

In the event of injury an employee, employees, using their mobile device, use the application installed on their phone to report the injury. Checks and balances in the process require the app to be utilized by on-site supervisors, H.R. administrators or any designated employer representative who can report an injury for another employee. This employer representative option is utilized on a voluntary or in some cases a legislatively safety mandated basis if smart phone/mobile devices are not accessible at the workplace as required by internal regulations, work place codes, or circumstances related to an injury.

At this point, the employee enters relevant information about their injury including, date, time, location, witnesses, and nature of injury. In some embodiments, injured workers may also take and submit photos and videos of location, injury, and witnesses through the application.

Relevant parties, determined by the employer are setup so that they receive information about a claim at various points, ranging from as soon as an employee begins to fill out a claim, at the time of claim submission, a set number of hours or days after a claim, or upon review by a different relevant party. Employees will have the option to include family members as a relevant party especially in the event the severity of the injury results in a life threatening nature.

Employees or the designated employer representative complete the information related to the claim and submit the claim using the mobile application. Relevant parties and administrators, as preset by employer, then receive notice of the claims submission at various points. These relevant parties are able to use any web-enabled device to connect to the web portal where they are able to view and manage claims. Relevant parties designated in the information supply chain will able to update status information related to the claim and it's processing.

An injured employee will be able to receive physician recommendations, as preset by employer, defined by state regulations or have the freedom to choose a physician or facility based on location, injury type, hours of operation, and physician specialty. In some embodiments, employers may opt to use a telemedicine network, where physicians are connected via smart phones for phone or video calls with injured parties to expedite treatment and diagnosis.

Once injured employee visits physician, and receives treatment plan they are able to communicate to the concierge team, either directly through the application, or by phone, email, or text message communication with the team. The concierge team also follows up with physicians at this point to verify treatment plan, and add this information to the claim file using the web portal for all relevant parties to see.

As employee receives treatment and works toward improved health, status is monitored through outreach by the concierge team, with status' being updated in the web portal. Both relevant parties and the injured employee are able to view the status of the claim using the web portal and mobile application respectively.

During treatment and recovery, the mobile application and concierge team are able to provide recommendations and incentives to employees to encourage expedited return to health. The concierge team will manage treatment plan progress notes in the claim file, and communicate with employees through text, phone, email or messaging in the application to monitor the expected outcome and timeline for recovery. Recommendations may include pre-identified treatment, therapy, and rehabilitation centers that may be paired with pre-negotiated financial arrangements agreed upon by so employers or system operators.

Upon claim resolution, communication is sent to all parties through the web application and mobile application as appropriate. This may include information about payment, or actual payment provided through the application.

Should an injured employee wish to engage legal counsel to prosecute their claim, the mobile app may provide lawyer recommendations. Upon selection of counsel, the web portal can be used to share relevant information with all parties to ensure transparency and an assessment of the economic value of the claim with and without litigation options. Should a settlement be determined, payment may also be provided through the application.

In some embodiments, actions performed by a concierge team including contact of doctor and injured party for informational updates, monitoring of patient status and communication of claim information and recommendations may be partially or entirely automated using the mobile application and web portal, with information entered from algorithms, self reported by patient, and reported by third parties using either the web portal or mobile application. Additional contact information requests can be utilized by the communication and follow-up system. This system can allow for information requests to be submitted through the system, requesting documents, images, videos, or general information that can be sent to a relevant party through the system. Once sent, this information can be tracked and followed up on utilizing a concierge team or logic engine. Example uses of this would be sending a request for video interview to a witness of an incident, whereby a witness would receive a text with a link to upload a video of their testimony of the incident, or a supervisor is requested to provide information about a workers responsibilities, and, can be sent in a link via email to fill out or respond directly and have notes uploaded to a claims file.

Figure 2:
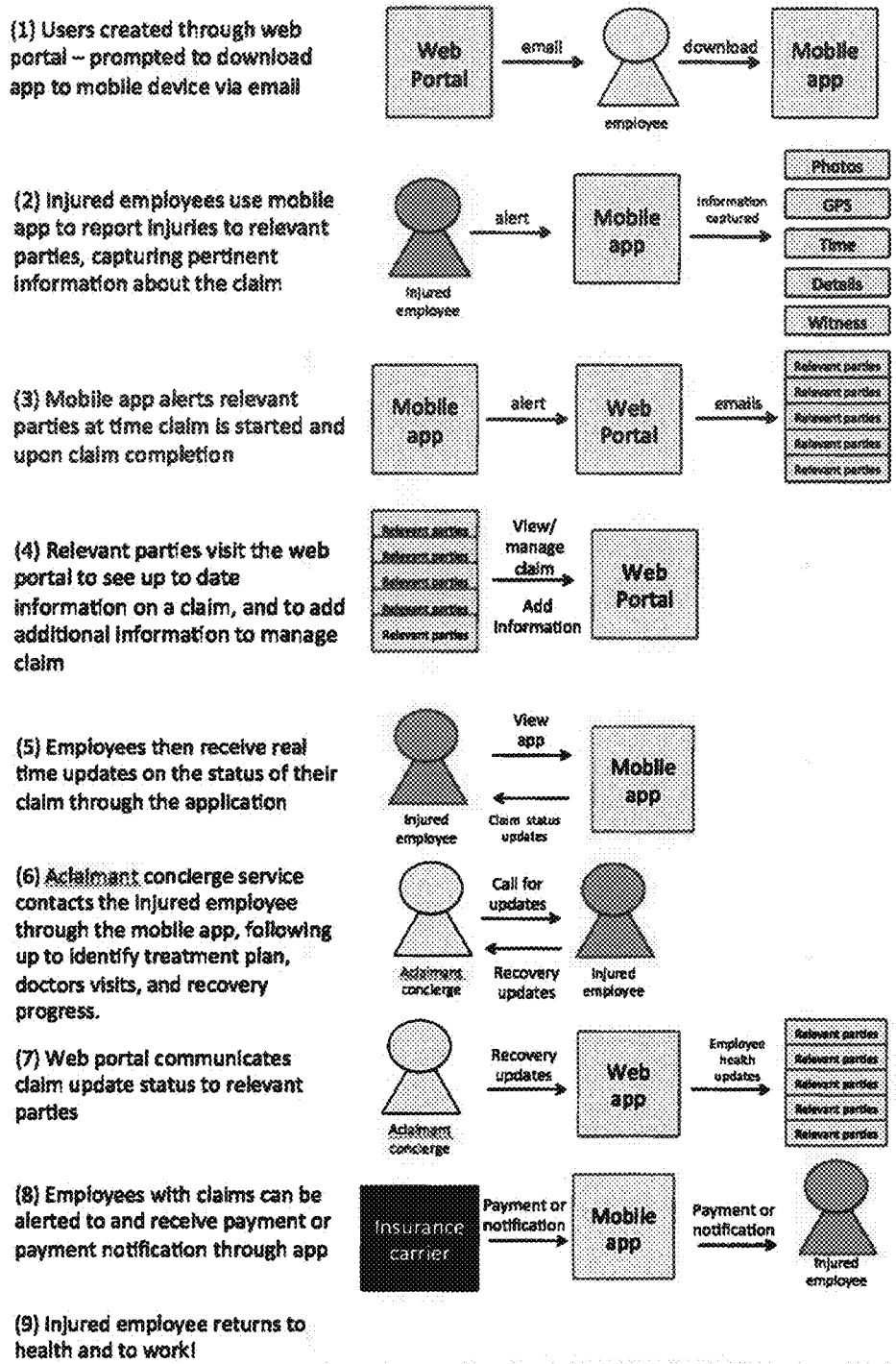
FIG. 2 depicts exemplary pictorial diagram of the employee process.

FIG. 2 shows an alternate and illustrative view of the employee process and interaction with the mobile application and web portal with various parties. This is shown to provide an additional perspective of an embodiment of the process shown in FIG. 1.

Figure 3:
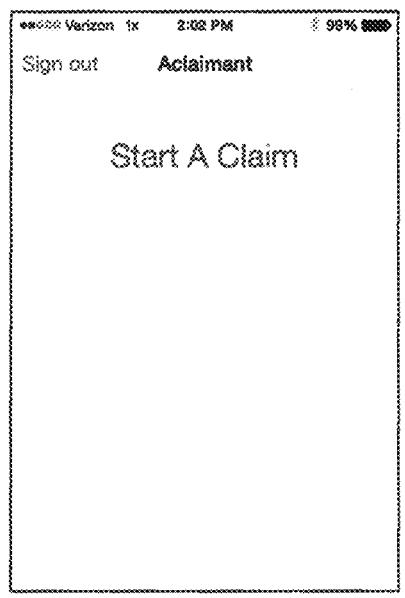
FIG. 3 depicts an exemplary home screen that may be rendered on a mobile device.
Figure 4:
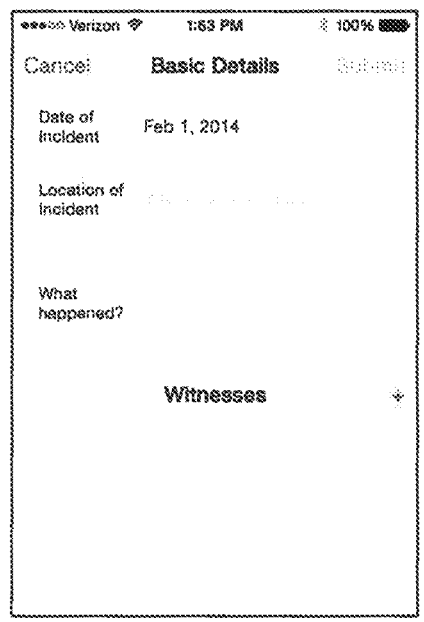
FIG. 4 depicts an exemplary basic claim filing screen that may be rendered on a mobile device.
Figure 5:
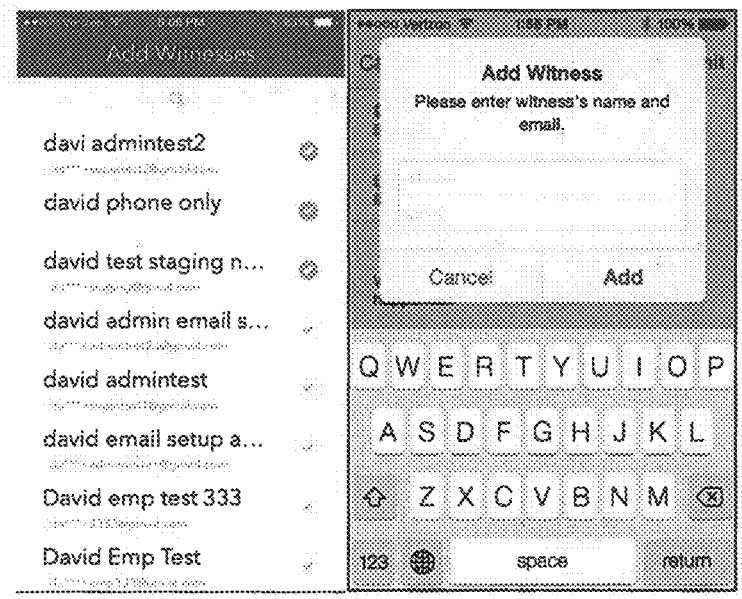
FIG. 5 depicts an exemplary add witness to a claim screen that may be rendered on a mobile device.
Figure 6:
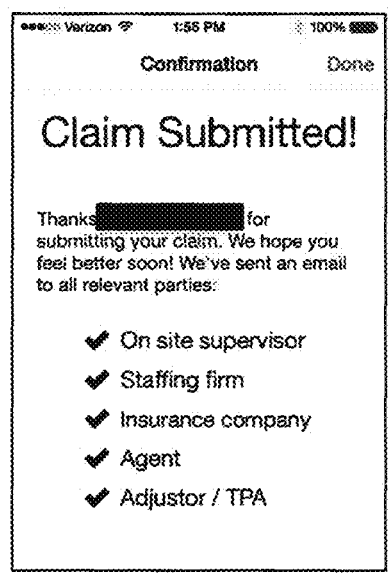
FIG. 6 depicts an exemplary claim submission confirmation screen that may be rendered on a mobile device.

FIGS. 3-6 illustrate exemplary screens that a mobile application may use in so some embodiments to capture and report injury information from an employee. Some mobile interfaces may guide employees through the process. In this embodiment, users are shown the initial screen that prompts them to report an injury by submitting a claim (FIG. 3). FIG. 4 shows an embodiment of basic information capture related to an injury including the date, prepopulated using the phones internal calendar, location of incident, also supplemented by a capture of the phones GPS at time of submission, description of the injury, with optional ability to add photos or video, and witnesses of the injury. FIG. 5 shows an embodiment of a witness identification screen, to alert others to witnesses of the reported injury. For faster entry, witnesses may also be captured using video or audio recording, and field entry is expedited using employee suggestions from an employer's prepopulated list of employees in the application. FIG. 6. Shows an exemplary embodiment of a claims confirmation screen, indicating to a user exactly which relevant parties have received their information. At this point, users may also receive physician or telemedicine recommendations and be contacted by the concierge team.

Figure 7:
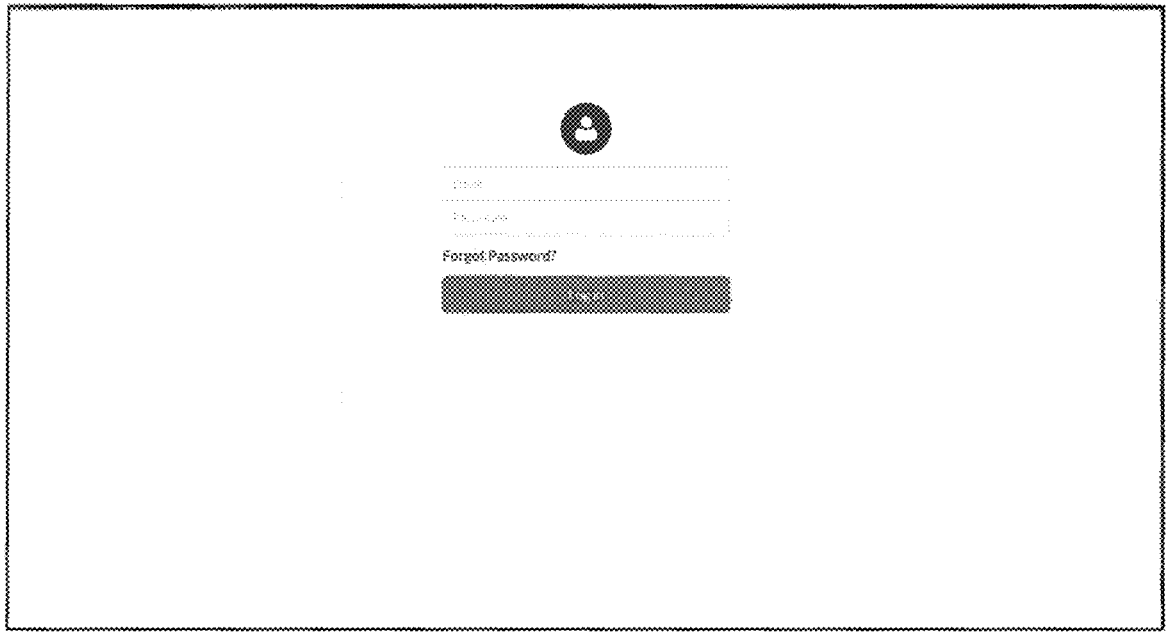
FIG. 7 depicts an exemplary login screen that may be rendered on a web portal.
Figure 8:
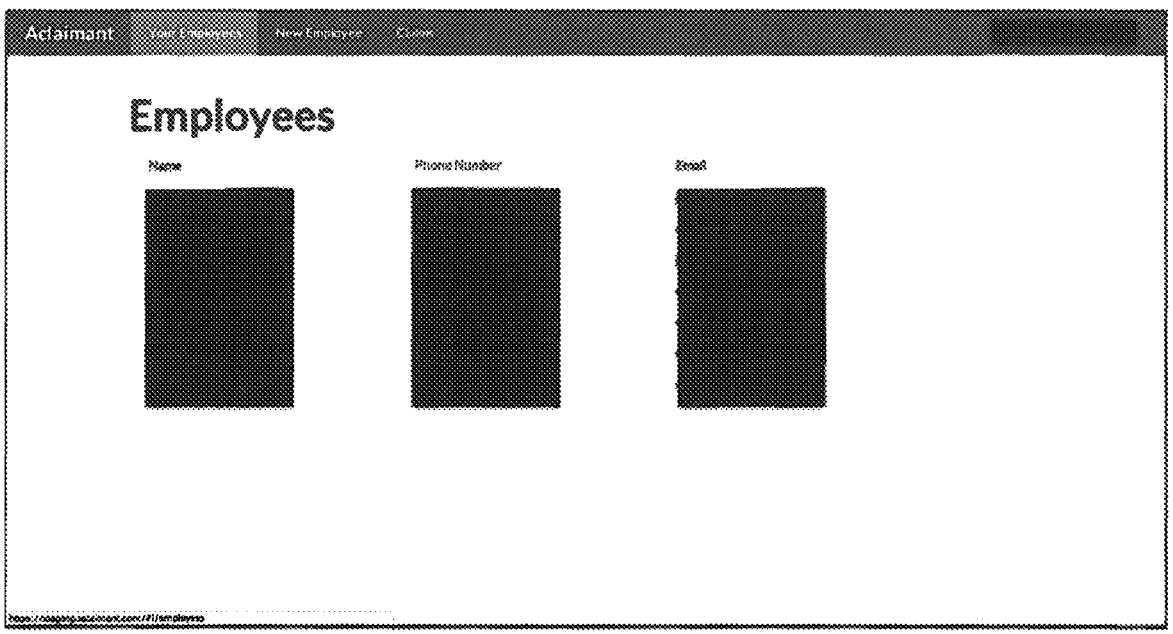
FIG. 8 depicts an exemplary employee management screen that may be rendered on a web portal.
Figure 9:
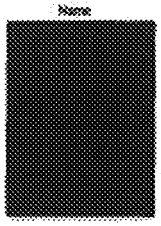
FIG. 9 depicts an exemplary new employee creation screen that may be rendered on a web portal.
Figure 10:
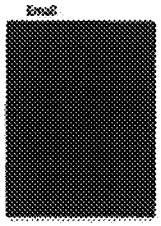
FIG. 10 depicts an exemplary claim submitted screen that may be rendered on a web portal.
Figures 11, 12:
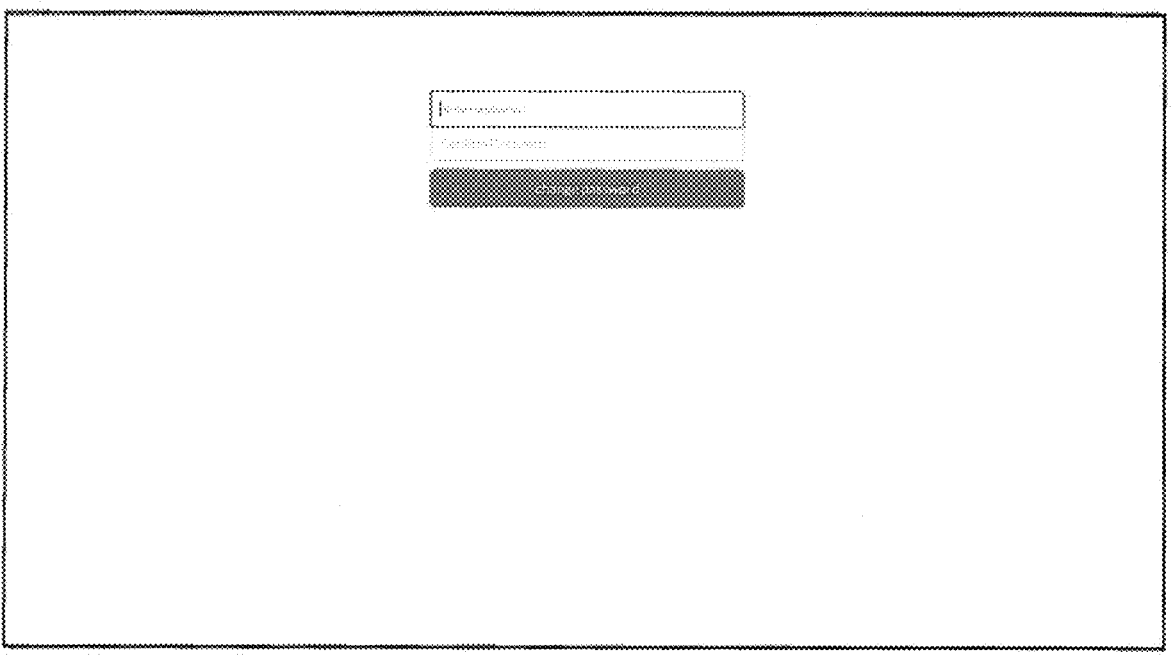
FIG. 11 depicts an exemplary claims submitted screen with the area of a claims submission highlighted that may be rendered on a web portal.
FIG. 12 depicts an exemplary logout screen that may be rendered on a web portal.

FIGS. 7-12 show an embodiment of exemplary screens that a web portal may use to capture and disseminate relevant information about a claim to parties involved in the process. FIG. 7 illustrates one embodiment of a login screen that allows an administrator or relevant party to be identified by using a set username and password. FIG. 8 illustrates an embodiment of an employee management page, whereby employers and administrators are able to view a full list of all employees currently set up in their system along with relevant information. FIG. 9 illustrates one embodiment of an employee creation tool, whereby employers or administrators can setup relevant employees and parties in their system, assigning roles, and placing in certain companies. FIGS. 10 and 11 illustrate one embodiment of a claims screen on a web portal, where an employer can view, cancel, and explore claims submitted by their employees, or relevant parties may see claims submitted by any of the employers or employees that they are a relevant party to. FIG. 11. Highlights an ability to view the location of the GPS of the location that an employee submitted a claim, using a mapping tool through the web interface. FIG. 12 illustrates one embodiment of a log out and change password screen that may be rendered on a web portal.

FIG. 13 shows an exemplary embodiment of the architecture that supports web portal, mobile web portal, and native applications for the prevention and adjudication of workers comp claims. Information to run the application is stored in various tables in a database, including employee information, relevant party information, and claim information. This database communicates with different servers that run services for employees, claims, and an email communication. These services communicate through an API frontend to the different native applications, mobile web applications, and web portals that are running on mobile devices, mobile devices, and web enabled devices respectively.

FIG. 14 shows an exemplary embodiment of various incentives and information that can be provided to workers to encourage injury prevention and education, and injury recovery. These may be provided through the application, through a concierge team and/or through an employer or designated subject matter experts in the fields of health and welfare, safety and loss control, pharmaceutical/Rx interactions, durable medical equipment, physical and occupational therapy, nutrition and wellness. For a non-injured employee, the incentives and information that can be shared include access to 3rd party recommendations and notifications for a free or minimal cost health and wellness screening. Tangible and non-tangible incentives will be offered in return for participation in wellness initiatives that include diet, exercise, and the dangers unknown or misunderstood comorbidities that may already exist in an employee's health status. General information on worker's rights pertaining to insurance information and safety in the workplace will also be available for review. Injured employees may be a candidate for financial discounts, receive recommendations, and referral information on treatment facilities, rehabilitation centers, medication purchases, and therapeutic centers. Employees will be provided information about the extent and limitations of their coverage, and shared information on how to avoid out of pocket expenses. Finally, employees may be provided cash or cash equivalents upon completion of various phases of their treatment including participating in recommended therapies and visitation of physicians in a timely fashion.

Figure 15:
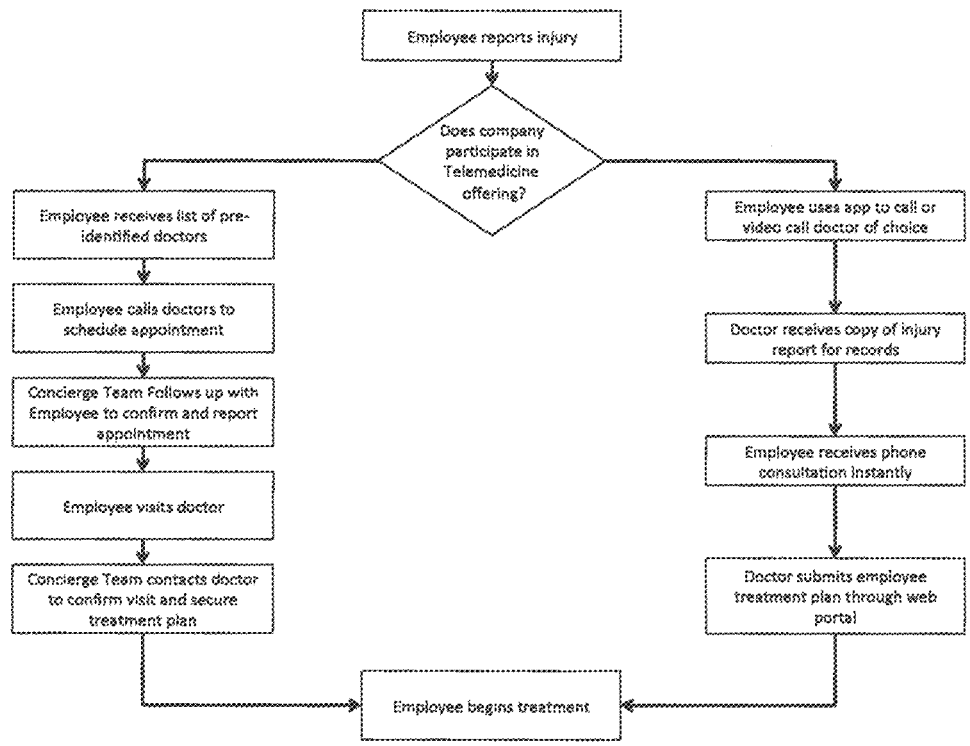
FIG. 15 depicts an exemplary block diagram highlighting the process for an employee to report an injury and contact a physician using telemedicine and traditional channels.
Figure 16:
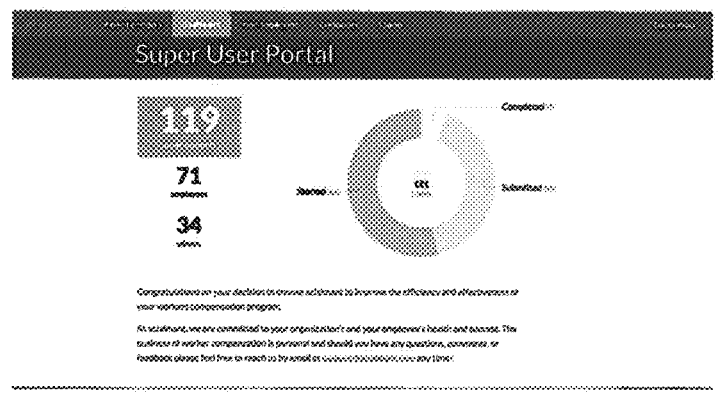
FIG. 16 illustrates an exemplary embodiment of a claims and incident management dashboard, whereby a user can easily see and understand the usage of a claims management system, the status of outstanding claims, and key helpful links and resources.
Figures 17, 18:
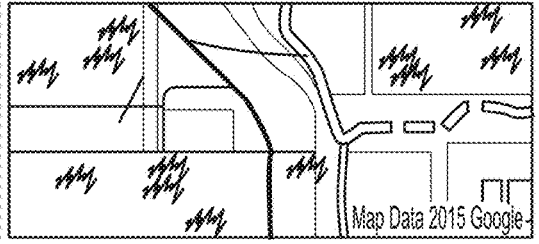

FIG. 15 shows an exemplary embodiment of a process that an employee may go through after reporting an injury when determining which physician to visit. For employers not choosing to participate in a telemedicine offering, or nurse triage hotlines, employees are provided a list of pre-approved physicians and medical facilities. Upon receiving this list, employee contacts physician to schedule appointment. Employee may also be contacted by concierge team to confirm appointment if the concierge team is part of the information supply chain when the appointment is entered into the system. Upon employee confirmation of the scheduled visit to the physician, the concierge team initiates the process of recording the visit as completed through the application, after which concierge team enters information into the web portal and employee begins treatment.

For employers participating in the telemedicine offering, their employees are able to instantly connect with a physician or nurse specialist by phone or video call upon submission of injury. Physicians participating in telemedicine offering are prequalified and approved by employers prior to their use. Additionally, these physicians are categorized by hours of operation and specialty. Physicians are provided a web portal login to receive information and report information back to employees and employers.

Upon submission of an injury, an employee participating in telemedicine may be presented with a list of approved and participating physicians to contact, may schedule a time with a physician for a call back, or may be automatically connected with a selected specialist. Employees are connected by phone or video call with physicians using a variety of technologies readily available on mobile devices to allow voice or video communication. When contacted by an injured employee, a physician participating in telemedicine receives access to view their information submitted through the web portal they are provided access to. Upon completion of the consultation, the physician is able to add notes to the web portal that are added to the employees claim file, which is then provided to relevant parties in the process. Upon completion of this, employees begin treatment.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer programs, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single program or packaged into multiple programs.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An enterprise incident management system, comprising:
    a workers compensation claim administrator computer system including a user interface, the workers compensation claim administrator computer system and user interface owned by an employer of an employee and the user interface being used by the employer to identify a plurality of relevant parties for a current claim administration of the employee;
    an employee computing device having data processing hardware that is communicatively-coupled to the user interface of the workers compensation claim administrator computer system and having a GPS device, wherein an app of the workers compensation claim administrator is downloaded by the employee computing device and executed by the employee computing device, the employee computing device being configured to:

capture and report, using the downloaded app of the workers compensation claim administrator, an injury claim of the employee, determine, using the GPS device, a location at which the injured employee submits the report of the injury claim;

report, using the downloaded app of the workers compensation claim administrator upon reporting the incident, the location at which the injured employee submits the report, wherein the location is included in the report created using the downloaded app of the workers compensation claim administrator;

communicate the report to the user interface; and alert, by the downloaded app of the workers compensation claim administrator, each of the plurality of relevant parties when the injury claim is started and when the injury claim is completed;

the user interface being visited by the plurality of relevant parties to view updates on the injury claim and add information to the injury claim; and the app of the workers compensation claim administrator provides real time updates on the status of the injury claim and provides incentives, wherein the incentives are incentives for the injured employee based on a condition of information entered by third party providers and wellness initiatives for an uninjured employee;

a third party claim reporting tool provided for a third party administrator and a carrier; and a claims management tool provided at the workers compensation claim administrator computer system, wherein the third party claim reporting tool is communicatively-coupled to the claims management tool.

2. The enterprise incident management system of claim 1, wherein the employee computing device includes: an imaging device for capturing one or more images of the incident, wherein the imaging device captures one or more of still images and video of the incident.

3. The enterprise incident management system of claim 1, wherein the workers compensation claim administrator computer system further comprises a claims investigation management database.

4. The enterprise incident management system of claim 1 further comprising: a medical/telemedical network system communicatively-coupled to one or more of the workers compensation claim administrator computer system and the client end for facilitating workflow optimization of the incident.

5. The enterprise incident management system of claim 1, wherein the claims management tool includes a claims matrix and an algorithm for identifying problematic claims within structured claims data.

6. The enterprise incident management system of claim 1 further comprising: a third party investigator end communicatively-coupled to the workers compensation claim administrator computer system for permitting the third party investigator end to gain access to the identified problematic claims.

7. The enterprise incident management system of claim 1 further comprising: an incentifier system communicatively-coupled to the employee computing device that provides health information to the employee at the employee computing device for encouraging the client to overcome the incident and return to work.

8. The system of claim 1, wherein the workers compensation claim administrator computer system further comprises a display configured to display an alert based on the capture and report of the incident at the employee computing device to the workers compensation claim administrator computer system.

9. The enterprise incident management system of claim 1, wherein the employee computing device is further configured to recommend, based on the location of the claim event, a doctor to treat the injured user.

10. The enterprise incident management system of claim 1, wherein the employee computing device is further configured to prompt the injured user, at preset time periods to confirm information about the injured user and participate in preventive health services.

11. The enterprise incident management system of claim 1, wherein the employee computing device is further configured to provide a pre-identified injury reporting service to set up an injury file for the injured user.

12. The enterprise incident management system of claim 11, wherein the pre-identified injury reporting service is one of an injury reporting SMS service and an injury reporting hotline.

* * * * *